(12) United States Patent
Yacoubian

(10) Patent No.: US 11,668,658 B2
(45) Date of Patent: Jun. 6, 2023

(54) MULTI-PARAMETER INSPECTION APPARATUS FOR MONITORING OF ADDITIVE MANUFACTURING PARTS

(71) Applicant: Araz Yacoubian, Encinitas, CA (US)

(72) Inventor: Araz Yacoubian, Encinitas, CA (US)

( * ) Notice: Subject to any disclaimer, the term of this patent is extended or adjusted under 35 U.S.C. 154(b) by 5 days.

(21) Appl. No.: 17/387,107

(22) Filed: Jul. 28, 2021

(65) Prior Publication Data
US 2021/0356408 A1   Nov. 18, 2021

Related U.S. Application Data

(62) Division of application No. 16/595,390, filed on Oct. 7, 2019, now Pat. No. 11,105,754.

(Continued)

(51) Int. Cl.
| | |
|---|---|
| *G01N 21/95* | (2006.01) |
| *G01N 21/47* | (2006.01) |
| *B33Y 30/00* | (2015.01) |
| *B33Y 50/00* | (2015.01) |
| *B22F 10/20* | (2021.01) |

(Continued)

(52) U.S. Cl.
CPC ......... *G01N 21/9515* (2013.01); *B22F 10/20* (2021.01); *B22F 12/00* (2021.01); *B33Y 30/00* (2014.12); *B33Y 50/00* (2014.12); *B33Y 50/02* (2014.12); *G01N 21/21* (2013.01); *G01N 21/4788* (2013.01); *B22F 10/30* (2021.01); *G01N 2021/479* (2013.01); *G01N 2021/4735* (2013.01); *G01N 2021/4792* (2013.01); *G01N 2021/8848* (2013.01); *G01N 2201/0634* (2013.01); *G01N 2201/0638* (2013.01); *G01N 2201/06113* (2013.01)

(58) Field of Classification Search
CPC ....... G01N 21/4788; G01N 2021/4792; G01N 2021/4735; G01N 2201/06113; G01N 2201/0638; G01N 2201/0634; G01N 2021/479; G01N 2021/4711; G01N 21/9515; G01N 2021/8411; B22F 10/00; B22F 10/10; B22F 2999/00; B33Y 30/00; B33Y 50/00; B33Y 10/00; B33Y 50/02
See application file for complete search history.

(56) References Cited

U.S. PATENT DOCUMENTS

| | | |
|---|---|---|
| 8,477,175 B2 | 7/2013 | Shaffer et al. |
| 9,457,428 B2 | 10/2016 | Webster et al. |

(Continued)

*Primary Examiner* — Michael P LaPage
(74) *Attorney, Agent, or Firm* — James R. McDaniel

(57) ABSTRACT

Additive manufacturing, such as laser sintering or melting of additive layers, can produce parts rapidly at small volume and in a factory setting. To ensure the additive manufactured parts are of high quality, a real-time non-destructive evaluation (NDE) technique is required to detect defects while they are being manufactured. The present invention describes an in-situ (real-time) inspection unit that can be added to an existing additive manufacturing (AM) tool, such as an FDM (fused deposition modeling) machine, or a direct metal laser sintering (DMLS) machine, providing real-time information about the part quality, and detecting flaws as they occur. The information provided by this unit is used to a) qualify the part as it is being made, and b) to provide feedback to the AM tool for correction, or to stop the process if the part will not meet the quality, thus saving time, energy and reduce material loss.

2 Claims, 19 Drawing Sheets

Related U.S. Application Data

(60) Provisional application No. 62/771,568, filed on Nov. 26, 2018, provisional application No. 62/742,807, filed on Oct. 8, 2018.

(51) Int. Cl.
    *B22F 12/00*    (2021.01)
    *B33Y 50/02*    (2015.01)
    *G01N 21/21*    (2006.01)
    *B22F 10/30*    (2021.01)
    *G01N 21/88*    (2006.01)

(56) References Cited

U.S. PATENT DOCUMENTS

| | | |
|---|---|---|
| 10,022,818 B2 | 7/2018 | Webster et al. |
| 10,124,410 B2 | 11/2018 | Kanko et al. |
| 10,131,133 B2 | 11/2018 | Bentz et al. |
| 10,157,500 B2 | 12/2018 | Gritsky et al. |
| 10,368,011 B2 | 7/2019 | Annau et al. |
| 10,369,776 B2 | 8/2019 | Batchelder |
| 2004/0109173 A1* | 6/2004 | Finarov ............ G03F 1/84 356/625 |
| 2014/0271964 A1 | 9/2014 | Roberts, IV et al. |
| 2015/0268099 A1 | 9/2015 | Craig et al. |
| 2016/0023403 A1* | 1/2016 | Ramos ............ B33Y 30/00 425/171 |
| 2016/0219266 A1 | 7/2016 | Lane |
| 2018/0326663 A1* | 11/2018 | DeMuth ............ B22F 10/00 |
| 2019/0009358 A1* | 1/2019 | Vorontsov ............ H01S 3/005 |
| 2019/0009369 A1 | 1/2019 | Vorontsov |
| 2019/0195626 A1 | 6/2019 | Iseli et al. |
| 2019/0383754 A1* | 12/2019 | Zhang ............ G01N 21/8806 |
| 2020/0025744 A1* | 1/2020 | Tsai ............ G02B 21/18 |
| 2020/0238625 A1 | 7/2020 | Champion et al. |

\* cited by examiner

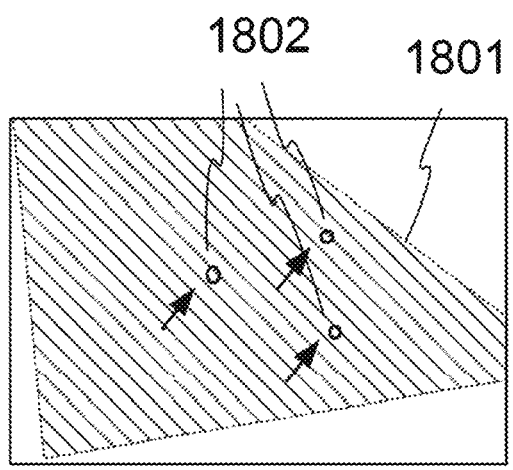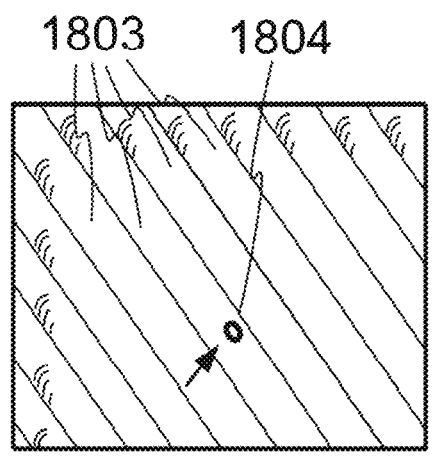
FIG. 18A
FIG. 18B

MULTI-PARAMETER INSPECTION APPARATUS FOR MONITORING OF ADDITIVE MANUFACTURING PARTS

CROSS-REFERENCE TO RELATED APPLICATIONS

This application is a divisional patent application of U.S. patent application Ser. No. 16/595,390, filed on Oct. 7, 2019, which is a continuation-in-part of U.S. Provisional Patent Application No. 62/742,807, filed on Oct. 8, 2018 and U.S. Provisional Patent Application No. 62/771,568, filed on Nov. 26, 2018, the disclosures of which are hereby incorporated by reference in their entirety to provide continuity of disclosure to the extent such disclosures are not inconsistent with the disclosure herein.

BACKGROUND

Additive manufacturing, such as laser sintering or melting of additive layers, can produce parts rapidly at small volume and in a factory setting. Ensuring production quality is crucial for additive (AM) manufacturing. To ensure the parts are of high quality, a real-time non-destructive evaluation (NDE) technique is required to detect defects while they are being manufactured. The present invention describes an in-situ (real-time) inspection unit that can be added to an existing additive manufacturing (AM) tool, such as an FDM (fused deposition modeling) machine, or a direct metal laser sintering (DMLS) machine, providing real-time information about the part quality, and detecting flaws as they occur. The information provided by this unit is used to a) qualify the part as it is being made, and b) to provide feedback to the AM tool for correction, or to stop the process if the part will not meet the quality, thus saving time, energy and reduce material loss. The described NDE technique is incorporated in additive manufacturing machine to capture defects in real time or any other metal printing tool. The sensor data is used to identify defects as they occur such that real-time corrective action can be taken. It also provides parameters that enable the prediction of the part quality

SUMMARY

The present invention describes a real-time (in-situ) non-destructive inspection (NDI) that uses a combination of multiple sensing/imaging modalities for detecting defects in additive manufacturing (AM) parts, such as 3D printed parts. These include multi-angle imaging, scanning radial illumination imaging, and polarization imaging, speckle illumination imaging, modulated speckle illumination imaging, multi-wavelength imaging, and spectral and temporal imaging to determine cooling rate. The final outputs are combined to produce a defect map. Each of these techniques detects different types of defects as described in the Technical Approach section. For example, scanning radial illumination reveals out-of-spec angled print layers, or gaps between print lines. Polarization imaging reveals variations in print layer finish, and can be used for measuring stress in optically clear plastics. Modulated speckle illumination measures micro-pits, voids, discontinuities, and multi-wavelength imaging is used for multi-material assessment to distinguish between defects at different material prints. In addition, it can be used in conjunction with polarization detection for birefringence measurements, such as for measuring stress in the part being printed. The multi-angle image reveals out-of-spec angled 3D prints. The speckle illumination approach measures granularity and surface roughness to detect micro-voids and non-fused metal. Spectral and temporal measurements detect of variations in cooling rates to reveal voids and discontinuities. An overview of the NDI approach is shown in FIG. 1.

Using multi-parameter detection enables a robust real-time inspection method that provides measurement redundancy, maximizing likelihood of detecting defects that may otherwise be missed using a single parameter sensing approach, and avoids false readings. This method provides fast and high spatial resolution defect detection to enable both part qualification after the print is completed, without requiring post inspection, as well as providing information to enable corrective action, such as to stop a potentially defective print, or to make real-time correction and continue the additive manufacturing process.

BRIEF DESCRIPTION OF THE DRAWINGS

Embodiments of the invention relating to both structure and method of operation may best be understood by referring to the following description and accompanying drawings.

FIGS. 18A and 18B are pictorial diagrams showing images and data illustrating an example of images and data obtained using modulated speckle illumination.

DETAILED DESCRIPTION

Figure 1:
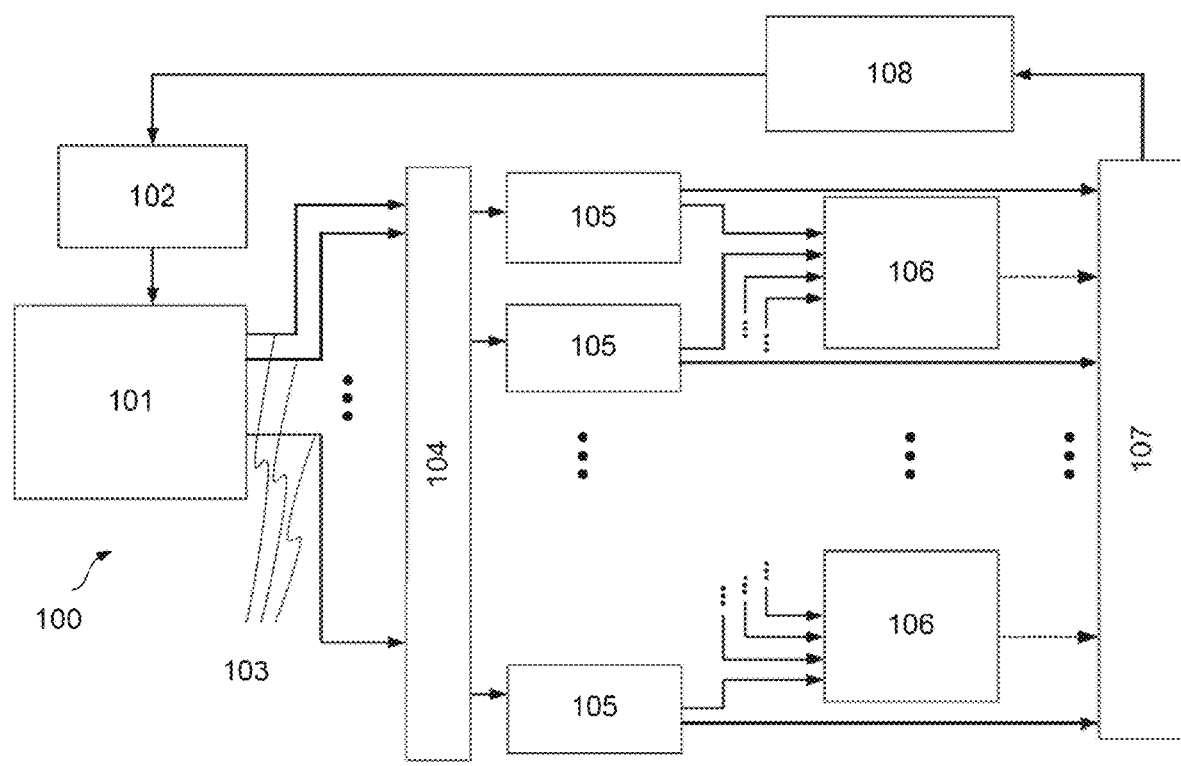
FIG. 1 is a perspective pictorial and block diagram illustrating overview of detecting defects in additive manufacturing parts.

FIG. 1 is a pictorial block diagram illustrating a schematic of a real-time inspection unit for detecting defects in additive manufacturing parts during printing using a multi-modal inspection 100. Multi-modal inspection apparatus 101 is comprised of light sources, components and detectors described herein is connected to an additive manufacturing unit, such as a 3D printer, either mounted internally, or externally, such as through a viewing window or an opening port, or a combination thereof. The apparatus is controlled by a set of electronics, namely a control unit 102. Sensor outputs 103 send signal and image data for processing that indicate various parameters about the printed part, such as presence of defects, and deviation from the original part design. The outputs are either pre-processed 104 digitally, or the raw sensor data is used, each corresponding to various inspection modalities 105. Inspection modalities 105 are combined to produce a defect map and to determine part quality 107 either individually or by combining with other modalities 106. These modalities include multi-angle imaging, scanning radial illumination imaging, and polarization imaging, speckle illumination imaging, modulated speckle illumination imaging, multi-wavelength imaging, and spectral and temporal imaging, or a combination thereof. The information from the defect map 107 is used to a) determine part quality, b) stop the print, if the part is deemed too defective, or c) as a printer feedback 108 to make corrective action to the part being printed by modifying the subsequent print layers to correct for the detected defects.

Using multi-parameter detection enables a robust real-time inspection method that ensures printed part quality. It provides measurement redundancy, maximizing likelihood of detecting defects that may otherwise be missed using a single parameter sensing approach, and avoids false readings. In some embodiments, the apparatus depicted herein are used for quality control and used as an add-on unit for quality control and feedback to additive manufacturing (AM) tool available in the market.

The advantage of the use of multi-parameter approach is that each parameter reveals various types of defects, thus it covers a broad range of print quality and additive manufacturing issues in a compact, light-weight, and high sensitivity robust manner.

Multi-Angle Sensing

Figure 2:
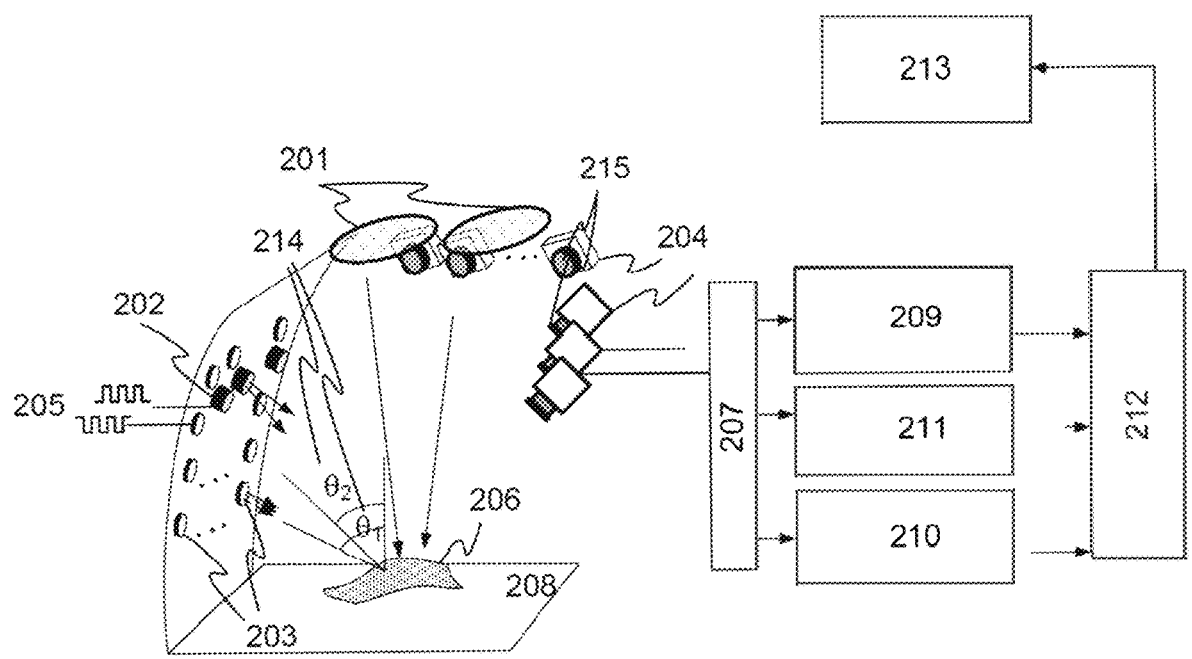
FIG. 2 is a perspective pictorial and block diagram illustrating an embodiment for detecting defects in additive manufacturing parts.

FIG. 2 depicts sintering laser entrance windows 201, wherein a sintered laser beam is capable of entering through the window and interacting with the metal part 206 to be sintered, a controlled speckle generation source 202, multi-wavelength LEDs 203, cameras 204 with optical filters 215, timing signals 205, metal part 206, pre-processing 207 such as spatial filtering, temporal filtering between frames image frames, low-pass or high pass filtering, Fourier filtering and Fourier analysis, Fourier transforms, differentiation, multiple frame addition, subtraction, multiplication, background subtraction, morphological image processing, wavelet transforms, and thresholding, powder beds 208, multi-angle data 209, speckle data 210, multi-wavelength, data and cooling time 211, combined defect map and decision 212, printer feedback 213, and incident angles 214. Multi-angle data 209 provide information about the presence of surface defects, such as voids and discontinuities. Speckle data 210 produces information about small defects, and multi-wavelength data and temporal measurements between multiple frames which produce cooling time 211 in each area of the specimen which indicates presence of surface and subsurface defects. The pre-processing 207 of the raw data, combined with the multi-angle data 209, speckle data 210, and cooling time data 211 are combined, namely by image or data addition, thresholding, and spatial filtering the outputs of each of these to produce a defect map 212. The defect map 212 shows position and size of surface and subsurface defects. This information is used a) to produce the quality of the part at each print layer, b) to determine if the part passes a certain threshold and that if the if print can continue, and c) and to send corrective information to the AM tool such that print layer information can be modified to correct for defects. This information is used as a printer feedback 213 so that subsequent layers can be corrected. For example, if a void is detected and the subsequent print will fill in that void by extra material.

FIG. 2 illustrates distributed light sources, such as light emitting diodes (LED) 203, positioned such that each produce a different illumination angle of incidence. The cameras across from the light source, as well as the cameras 204 placed on all side capture the reflected image from the printed portion of the part in the powder bed 208. Each light source 203 covers a narrow range of angles, and a combination of multiple light sources produce a full range of angular measurements as shown in FIG. 2. The light sources 203 are rapidly sequenced to produce multi-angle images 209 captured by the cameras. Light sources are rapidly sequenced by applying a signal such as 205, namely by changing the electrical current or voltage applied to each light source to turn it on or off, or to reduce the light source's luminous output. The signal to sequence the light source is applied by an electrical circuit, which is synchronized to the image capture of the cameras. FIG. 2 also includes speckle generation sources 202.

In some embodiment this apparatus is use for in-situ detection, such as for detection while the material is being printed using the additive manufacture apparatus. In other instances, the apparatus is used for detection of detects after the parts are manufactured, such as for printed part inspection, verification and qualification.

Figure 3:
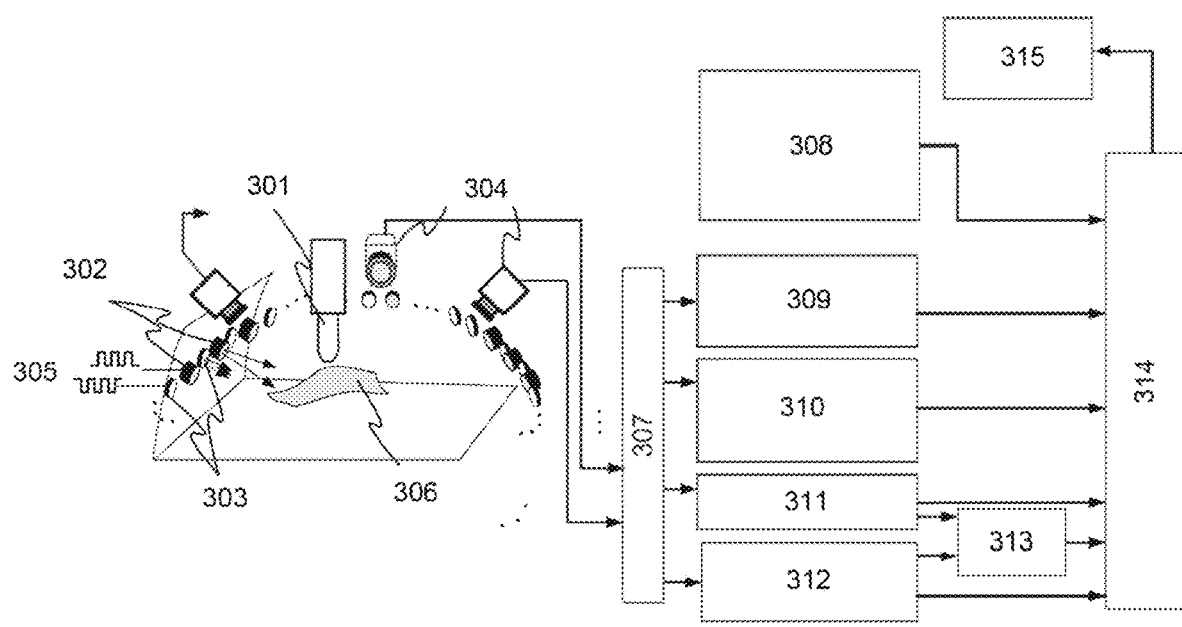
FIG. 3 is a perspective pictorial and block diagram illustrating another embodiment for detecting defects in additive manufacturing parts.

FIG. 3 is an overview of in-situ technology incorporated inside additive manufacturing unit. Multiple parameters are measured, namely using i) Scanning angular or radial illumination by sequentially turning on or pulsing each light source and detecting each angle ii) polarization imaging using polarization components that are mounted in front of the cameras, or using multiple adjacent cameras with polarizers oriented orthogonal to each other (this is not shown to avoid crowding of the figure). iii) Modulated speckle illumination generated by a combination of laser diodes, and scattering media, to detect very small defects, and iv) multi-wavelength imaging, where a combination of multi-wavelength LED-s are used for identifying defects in each specific material print section in a multi-material part manufacturing. Additionally, a combination of polarization and multi-wavelength measurements can yield stress in an optically clear part being printed by measuring birefringence.

FIG. 3 depicts a print head 301, speckle generation source 302, multi-wavelength LEDs 303, cameras with optics and polarizers 304, timing signals 305, part being printed 306, pre-processing 307, 3D print model (e.g., STL the) 308, expected parameters, scanning radial illumination data 309, differential speckle correlation data 310, polarization data 311, multi-wavelength data 312, stress data 313, combined defect map part quality indicator 314, and printer feedback 315. Pre-processing 307 are digital operations such as spatial filtering, temporal filtering between frames image frames, low-pass or high pass filtering, Fourier filtering and Fourier analysis, Fourier transforms, differentiation, multiple frame addition, subtraction, multiplication, background subtraction, morphological image processing, wavelet transforms, and thresholding. Scanning radial illumination data 309 provides information about the presence of surface defects, such as voids and discontinuities. Differential speckle correlation data 310 provides information about small defects. Polarization data 311 produces information about presence of defects such as small prints that deviate from an original intended print angle. Multi-wavelength data 312 provides information about defects that are of different material, if using different type of prints. In addition, when multi-wavelength data 312 is combined with polarization data 311, they produce information about birefringence and stress 313, as described throughout the present invention and in equation 3, such as for detecting stress builds in a transparent or translucent type print. All this information is combined, such by image or data addition, thresholding, and spatial filtering the outputs of each of these, to produce a defect map and part quality indicator 314. The defect map 314 shows position and size of surface and subsurface defects. This information is used a) to produce the quality of the part at each print layer, b) to determine if the part passes a certain threshold and that if the if print can continue, and c) to send corrective information to the AM tool such that print layer information can be modified to correct for defects. This information is used as a printer feedback 315 so that subsequent layers can be corrected. For example, if a void is detected and the subsequent print will fill in that void by extra material.

FIGS. 2 and 3 illustrate light sources such as light emitting diodes (LED) 203 and 303, positioned such they produce illumination at different angles of incidence. The cameras are placed across from the light source, as well as the cameras placed on various sides of the print chamber capture the reflected image from the printed portion of the part. Each light source covers a narrow range of radial angles, and a combination of multiple sources produce a full range of angular measurements as shown in FIG. 2 and FIG. 3. The light sources are rapidly sequenced to produce multi-radial scan images captured by the cameras. Light sources are rapidly sequenced by applying a signal such as 205 and 305, namely by changing the electrical current or voltage applied to each light source to turn it on or off, or to reduce the light source's luminous output. The signal to sequence the light source is applied by an electrical circuit, which is synchronized to the image capture of the cameras.

It is to be understood that defects such as voids, missing lines, large gaps, bulging material, improperly fused material and areas with incorrect print angles have different radial angular reflection characteristics than surrounding correctly printed areas. Therefore, a unique aspect of the present invention is that the scanning angular illumination measurements of the present invention reveal these defects. For example, a smooth surface produces angle of reflection $\theta_r$, that is equal to angle of incidence, $\theta_i$. namely $\theta_i = \theta_r$. Local differences in printed surface angles appear as brightness variations in the image. Additionally, non-smooth surfaces produce reflection/scattering at wider range of angles.

Another example is when there is a large gap in some of the lines that are too fine to be viewed and distinguished by standard imaging. The area with the gap causes light to go through the gap and reflect from the previously printed layer. Note however in order to detect these gaps, an angular scan is necessary, because only certain angles of incident will reveal the defect. It should be noted that the reflected image for each angle $(I_r)$ illuminated image, $I_R(x,y,\theta_r)$, reveals the directionality of the defect with respect to the illumination angle, and provides critical knowledge of the defect location and orientation. For a quality assurance however, and overall defect map can be obtained, $I_{RTot}(x,y)$, by an integral all the angular scans, namely:

$$I_{RTot}(x,y) = \int(x,y,\theta_r)d\theta_r \quad \text{(Eq. 1)}$$

Other information that can be extracted from these measurements is to measure variations between multiple images of different illumination angles. Digitally, this is achieved using one of several digital processing techniques, such as comparing normalized difference between 2 or more images, performing correlation or convolution in the spatial domain, or multiplication in the Fourier domain.

In some embodiments, the angular scan depicted in FIGS. 2 and 3 reveals incorrect print angles or print angle variations.

In some embodiments, this apparatus is used for in-situ detection, such as for detection while the material is being printed using the additive manufacture apparatus. In other instances, the apparatus is used for detection of detects after the parts are manufactures, such as for printed part inspection, verification and qualification.

In some embodiments, the light source and the camera are at fixed positions. In other embodiments, the light source or the camera, or both are shifted mechanically. Yet in other embodiments, multiple light source, multiple cameras, or a combination of both are placed at various angular positions, and when the light source is turned on simultaneously or sequentially, cameras capture is turned on simultaneously or sequentially, or a combination thereof. Yet in other embodiments, the various light source and camera turn on time and capture time are synchronized to produce images and detection data at various detection angles.

Since reflection between multiple layers has different angular characteristics, such as different angles of scattering, and different reflections, defects such as voids, line breakage and missing lines or large gaps in the lines can be detected using angular scanning illumination.

Figure 5A:
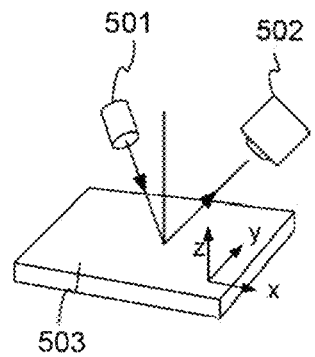
FIGS. 5A to 5C are perspective pictorial and block diagrams illustrating an embodiment that describe angular scanning illumination.
Figure 5B:
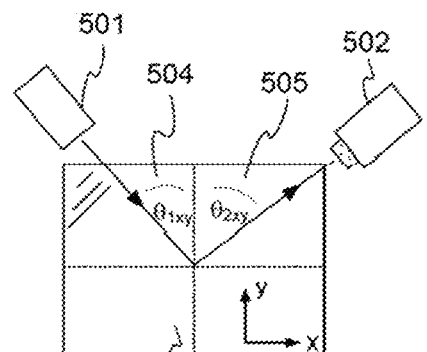
Figure 5C:
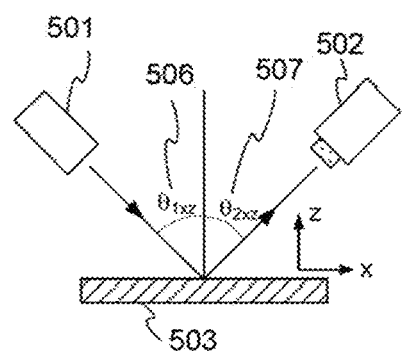

In sensor arrangements described throughout the present invention and depicted in FIGS. 2, 3 and 5, angular scan refer to scan in the radial direction, namely in the x-y direction depicted in FIG. 5B, or scan in the vertical direction, namely in the x-z direction depicted in FIG. 5C, or a combination of both, referring to any arbitrary angle in the x, y, and z directions.

The terms angular and radial are used interchangeably throughout this application.

FIGS. 5A to 5C are perspective pictorial and block diagrams illustrating an embodiment that describes angular scanning illumination. FIG. 5A depicts a perspective a light source 501 that is moving at various angular positions with respect to camera 502, thereby detecting defects as they occur while the specimen is being printed, or after the print is complete. FIG. 5B is the top view indicating the variation in the angles in radial direction, and FIG. 5C is the side view of the detection, indicating variations in the vertical angular direction 507. FIG. 5 depicts light source 501, camera 502, 3D printed specimen 503, incident angle in planar x-y direction 504, reflected or scattered angle in planar x-y direction 505, incident angle in vertical x-z direction 506, and reflected or scattered angle in vertical x-z direction 507.

In some embodiments, the light source 501 and the camera 502 are at fixed positions. In other embodiments, the light source or the camera, or both are shifted mechanically. Yet in other embodiments multiple light sources, multiple cameras, or a combination of both are placed at various angular positions, and when the light source is turned on simultaneously or sequentially, the cameras capture is turned on simultaneously or sequentially, or a combination thereof. Yet in other embodiments, the various light source and camera turn on time and capture time are synchronized to produce images and detection data at various detection angles.

Since reflection between multiple layers has different angular characteristics, such as different angles of scattering, and different reflections, defects such as voids, breakage, bulging and missing lines or large gaps in the lines can be detected using angular scanning illumination.

The terms angular and radial are used interchangeably throughout this application.

Defects such as voids, edges near missing lines, bulging material, improperly fused metal and areas with incorrect print angles have different angular reflection characteristics than surrounding correctly printed areas. Therefore, the angular measurements of the present invention reveal these defects. For example, a smooth metallic surface produces angle of reflection $\theta_r$, that is equal to angle of incidence, $\theta_i$. Namely $\theta_i = \theta_r$. Local differences in printed surface angles result in variations in the image. Additionally, non-smooth surfaces produce reflection/scattering at wider range of angles. These differences can also be detected with angular measurements.

For example, a stainless-steel sample printed by direct metal laser sintering (DMLS) are tested for surface quality by imaging using different angles of illumination. The tests reveal a few spots that were different than the rest of the print area. These defects are verified by microscope inspection. The results are shown in FIG. 4. Using two angles of illumination, for example at 30 and 57 degrees, defective spots of two different surface angles are revealed.

Figure 4A:
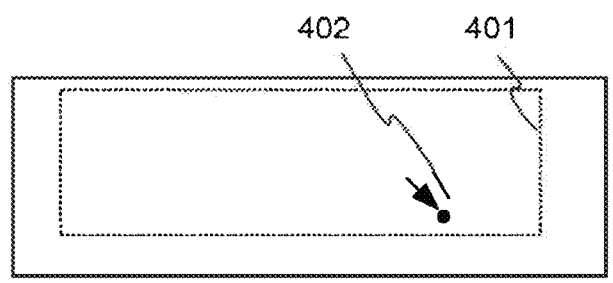
FIGS. 4A and 4B are pictorial diagrams showing images and data illustrating an example of images and data obtained using angular scanning illumination to reveal defects in metal prints.
Figure 4B:
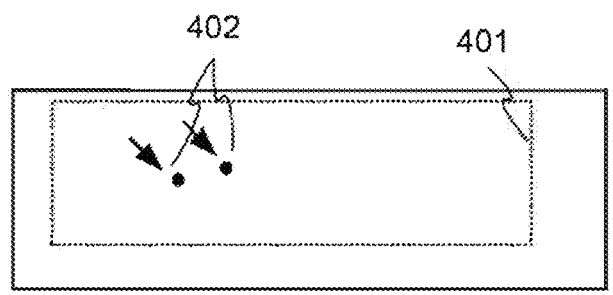

FIGS. 4 and 4B illustrate measuring surface quality by changing source angle, such as on a DMLS printed steel stainless sample. The light source (not shown) is set at 30-degree incidence in FIG. 4A, and 57 degree in FIG. 4B. The camera (not shown) is at a fixed position. The image width is approximately 60 mm. This example illustrates a detection of defects 402 on a printed part as outlined 401. Each measurement at different angles reveals a different set of defects 402.

In some embodiments, the sensor unit described herein is incorporated in the 3D printing machines without requiring design changes to the machine. The unit will detect printing defects in real-time. In other embodiments, the sensor data is utilized to pre-qualify parts for quality, and therefore minimize or eliminate the need for post fabrication testing.

Detection of Defects Using Speckle Illumination

Speckle noise is often a nuisance in coherent imaging applications. In the technique described in the present invention however, coherent illumination is utilized to detect very small variations in print lines, such as voids and pits. Because of its coherence characteristics, laser illumination results in speckle pattern when it passes through a diffuse media. Speckle size dependents on the random distribution of the diffuse media, and aperture size or the illumination spot incident on the diffuse media. When this diffuse illumination pattern is incident on a print surface with areas that contain pits, voids, or small defects on the order of the speckle size, a very bright signal is detected by the camera viewing the illuminated part. Therefore, small defects can be detected by this approach which is a unique aspect of the present invention. Another method of generating a speckle illumination is using a mufti-mode fiber. The two methods of generating speckle pattern are shown in FIGS. 7A to 7D, as will be discussed in greater detail later.

The observed image however will be very noisy, which is a characteristic of coherent illumination. To reduce speckle noise from the image while maintaining the advantage of coherent detection, either the random media, or the multi-mode fiber shown in FIGS. 7A to 7D are moved to smooth the detected image, as will be discussed in greater detail later.

To ensure that the signal is due to pits or other small defects, and to minimize chance of false calling a defect, the speckle generation source is spatially modulated as shown in FIGS. 7A to 7D, as will be discussed in greater detail later. Dust and other sources of noise can cause a bright spot in the image, as well. Pits and other stationary defects result in a bright spot in the image which re-appear as the speckle generation source is moved, or spatially modulated, whereas random speckle noise is a one-time occurrence. Therefore, spatial modulation will enable elimination of false readings. This approach can easily distinguish between a signal due to actual defects in the print and a signal due to dust and other particles, because the signal from defects is relatively stationary with respect to the sample.

In another embodiment similar to FIGS. 7A to 7D, multiple coherent or partially coherent light sources of the same or different wavelengths are used to enable testing of materials of different characteristics and reflectivity.

Figure 7A:
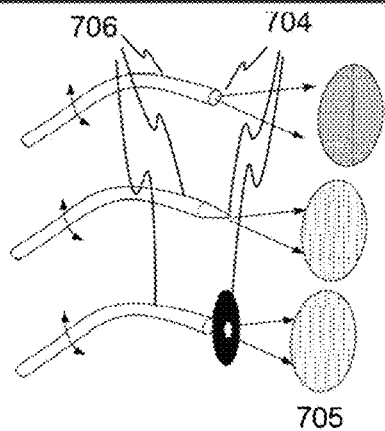
FIGS. 7A and 7B show two types of apparatus to generate coherent illumination.

Yet in other embodiments similar to FIG. 7A, speckle size is fixed, varied, or controlled to detect various size defects by controlling the illumination spot size on the diffuse media, or by selection of diffuse media granularity, or a combination thereof.

Figure 7B:
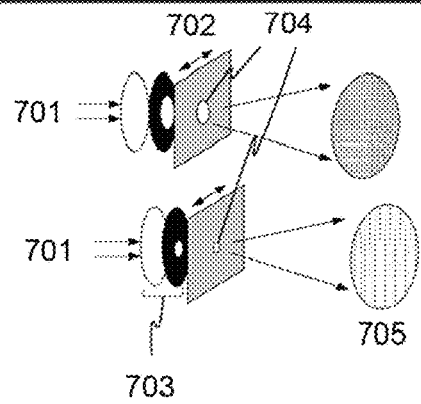

Yet in other embodiments similar to FIG. 7B, speckle size is fixed, varied, or controlled to detect various size defects by controlling optical fiber shape, size of the granularity, or polishing grit off the tip, the tapering angle, or a combination thereof.

Coherent illumination will generate an image that is full of speckle noise which makes it difficult to separate the signal from the defective area from noise. To overcome this, speckle noise reduction is achieved by rapidly moving the diffuser or the speckle generating fiber. It should be noted that even though the speckle pattern is moving, it will still reveal the defects, but noise in the image will be significantly reduced.

Figure 11:
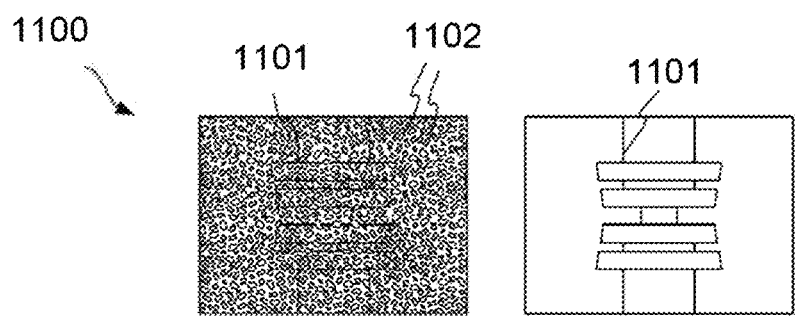
FIGS. 11A and 11B show an example of image improvement using speckle noise reduction techniques.

FIG. 11 an example of speckle noise reduction 1100 while imaging a specimen 1101, and speckle noise 1102. When the fiber or diffuser depicted in FIGS. 7A to 7D is stationary, the image produced is very noisy as indicated in FIG. 11A. When the diffuser or multi-mode fiber are moving rapidly, the speckle noise is minimized or removed, and the specimen 1101 or the part being printed is imaged with clarity, as depicted in FIG. 11B.

Speckle noise is often a nuisance in coherent imaging applications. Here however advantage is taken of coherent illumination by controlling speckle sizes to determine the granularity of the printed surface, and finding improperly fused material. Because of its coherence characteristics, laser illumination results in a speckle pattern when the laser passes through a diffuse media. Speckle size depends on the random distribution of the diffuse media and aperture size or the illumination spot on the diffuse media. When laser light scattered by a diffuser illuminates a medium of a specific granularity, such as a 3D printed metal surface, the scattered light is proportional to spatial correlation of the speckle distribution of the incident illumination and the spatial distribution of the granular media. Therefore, grain size and distribution characteristics of the metal surface can be obtained by controlling the speckle size of the illumination spot on the diffuse media. Therefore, the image intensity distribution captured by the camera shown in FIG. 2 will depend on speckle size and granularity distribution of the printed surface.

Figure 6A:
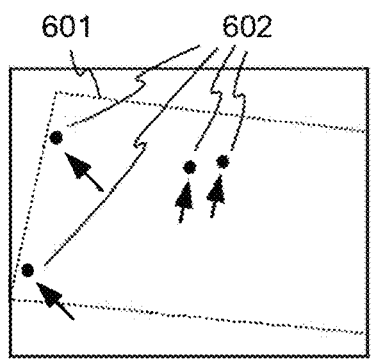
FIGS. 6A to 6C are examples of results of speckle-controlled illumination tests.
Figure 6B:
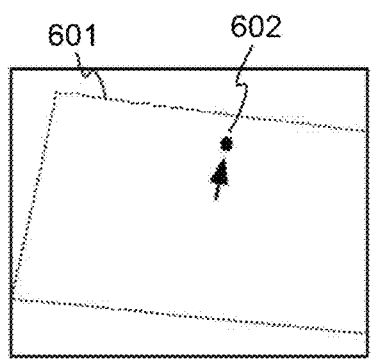
Figure 6C:
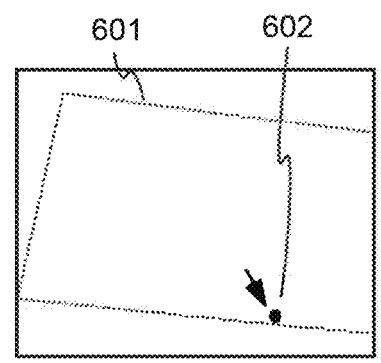

Speckle size-controlled imaging demonstrates this effect as depicted in FIGS. 6A to 6C. Areas or spots of different granularity on a metal part printed by direct metal laser sintering (DMLS) are detected using three different speckle size illuminations. This is achieved by controlling speckle size from coarse (FIG. 6A) to medium (FIG. 6B) to fine (FIG. 6C). The 3D printed stainless steel part is outlined in the dotted line 601. Defects 602 of different granularity are detected by controlling speckle size from coarse (FIG. 6A) to medium (FIG. 6B) to fine (FIG. 6C). Speckle size is controlled by controlling illumination area aperture on a moving diffuser. FIGS. 6A to 6C image widths are 25 mm.

Current 3D metal printers, such as DMLS, use high power lasers to melt the material directly without the need for post processing. If there is improper melting, there will be voids and discontinuities in the printed surface. The granularity of improperly fused section will be different (there will be many micro voids present), and this will be detected using the speckle imaging method.

FIGS. 7A to 7D show various methods of generating illumination of different speckle sizes. In FIG. 7A, a diffuse media combined with aperture control generates speckles of a desired size. In FIG. 7B, multi-mode fibers of different diameters (or using fiber tapers) are used to generate speckles of different size.

FIGS. 7A to 7D show two types of apparatus to generate coherent illumination 701 for granularity measurements. Speckle size 705 is controlled using aperture control and diffuse media (FIG. 7A), and using a multi-mode fiber of different sizes (FIG. 7B). To remove speckle noise from the image, the random media or the multi-mode fiber can be moved during image acquisition. FIGS. 7A, 7B depict a coherent light source 701, a moving diffuser 702, and optics and iris 703, and controlled aperture 704. The apparatus controls the speckle size 705, and incorporates a moving fiber 706 that reduces the speckle noise in the detected image.

In the apparatus shown in FIGS. 7A to 7D, several coherent sources are used (such as laser diodes) in conjunction with speckle generation apparatus. Each source generates a particular range of sizes of speckles. The source is combined either with optics and random media as shown in FIG. 7A, or coupled to multi-mode fibers of different apertures as shown in FIG. 7B. When using multi-mode optical fibers, either fibers of different diameters are employed, or aperture is controlled using fiber tapers. An example of fiber tapers are illustrated in FIG. 7A.

Figure 7C:
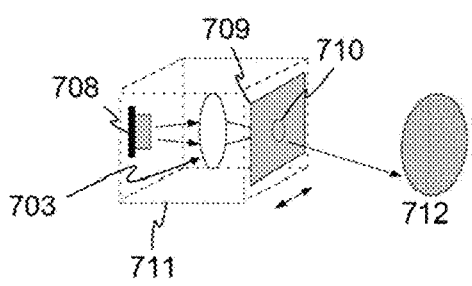
FIGS. 7C and 7D are perspective pictorial and block diagrams illustrating an embodiment for modulated speckle illumination.
Figure 7D:
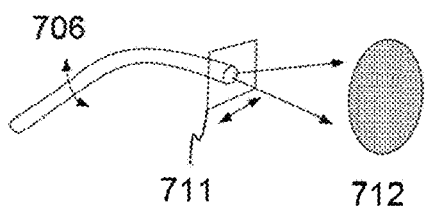

FIGS. 7C and 7D show two types of apparatus to generate coherent illumination for small defect detection. Speckles are generated using diffuse media (FIG. 7C), and using a multi-mode fiber (FIG. 7D). To remove speckle noise from the image, the diffuse media or the multi-mode fiber is moved rapidly. To minimize false detection, the speckle generation apparatus is spatially modulated as described in the herein. FIGS. 7C and 7D depict optics and iris 703, fast moving fiber 706, laser diode (LD) 708, fast moving diffuser 709, illuminated spot of light on the diffuser 710 by LD, spatially modulated speckle generator 711, and speckle illumination 712.

To remove speckle noise from the image, the random media or the multi-mode fiber is moved during image acquisition.

In some embodiments similar to FIGS. 7A to 7D, the coherent source, is a laser diode, a super luminescent source, a light emitting diode (LED), a light source or an LED with a narrow band wavelength filter placed in front of it or in the optical path, a gas laser, a solid state laser, or any other coherent or partially coherent source.

To reduce speckle noise from the image while maintaining the advantage of granularity detection, either the random media, or the multi-mode fiber shown in FIGS. 7A to 7D are conventionally moved to smooth the detected image. Examples of speckle noise reduction are shown in FIG. 11.

FIGS. 11A and 11B are examples of image improvement using speckle reduction techniques by moving a diffuser or moving a multimode fiber as depicted in S 7A to 7D. FIG. 11A shows a surface image of a specimen 1101, with image obscured by speckle noise 1102. FIG. 11B shows an image of the same specimen with speckle noise removed.

Spectral and Temporal Measurement to Determine Cooling Rate

Figure 8A:
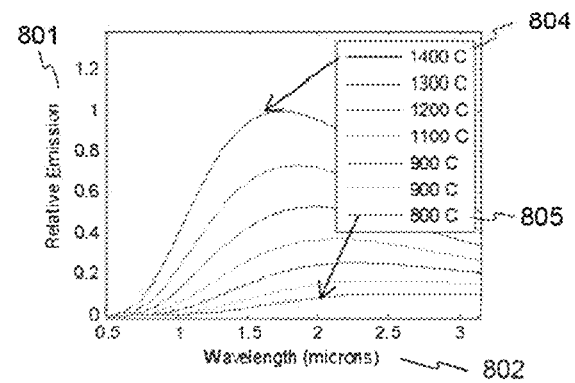
FIG. 8A shows spectral emission of hot metal calculated from blackbody radiation model.
Figure 8B:
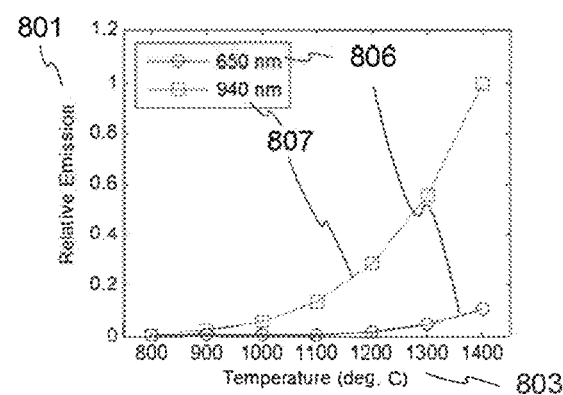
FIG. 8B shows relative emission at 650 and 940 nm versus temperature.

Detecting the rate at which the material cools is a method for detecting defects. For example, at the presence of voids or discontinuities, the additive manufactured material cools much slower than an area without voids. The cooling rate can be determined by measuring the spectral emission of metal as it is exposure to the sintering laser, and immediately after exposure. The emission spectra can be estimated by blackbody radiation model, namely:

$$I(\lambda,T)=(2hc^2/\lambda^5)[\exp(hc/\lambda kT)-1]^{-1} \quad \text{(Eq. 2)}$$

Where h is the Planck constant, c is the speed of light in vacuum, k is the Boltzmann constant, T is the temperature and $\square$ is the wavelength 802 (FIG. 8). The emission 801 spectrum for a metal surface that is cooling from 1400 deg. C. 804 to 800 deg. C. 805 is shown in FIG. 8A. Monitoring the output at a single wavelength or at two or more wavelengths in the visible and near IR spectral range, such as 650 nm 806 and 940 nm 807 (FIG. 8B)—wavelengths that are within the spectral detection range of CMOS cameras, the cooling rate can be calculated. The relative emission 801 for these two wavelengths with respect to temperature 803 are shown in FIG. 8B. FIG. 8A depicts the spectral emission of hot metal calculated from blackbody radiation model. FIG. 8B depicts the relative emission at 650 and 940 nm versus temperature.

FIG. 8A shows spectral emission of hot metal calculated from blackbody radiation model. It shows relative emission 801 with respect to wavelength 802 for a metal surface that is cooling from 1400 deg. C. 804 to 800 deg. C. 805 at 100 degree increments. FIG. 8B shows relative emission 801 with respect to temperature 803 for two wavelengths, 650 nm 806 and 940 nm 805.

Figure 9:
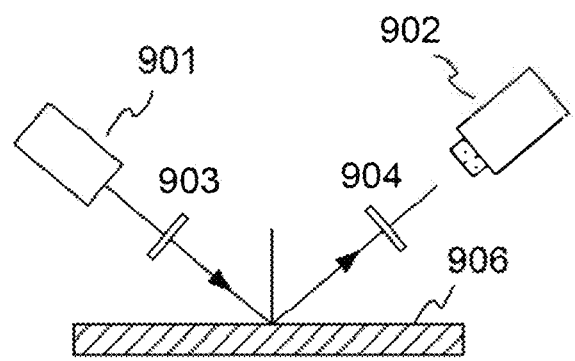
FIG. 9 is a perspective pictorial and block diagram illustrating an embodiment for mufti-wavelength imaging.

Multi-wavelength measurements are achieved using multi-color LED-s combined with monochrome cameras, or using white light sources combined with color filters as depicted in FIG. 9. FIG. 9 depicts light source 901, camera 902, filter 1 903, filter 2 904, and specimen 906.

For the apparatus depicted in various figures in the present invention, it is to be understood that the camera image is digitized, transferred to a computer and image processing and computing are conventionally performed.

Figure 10:
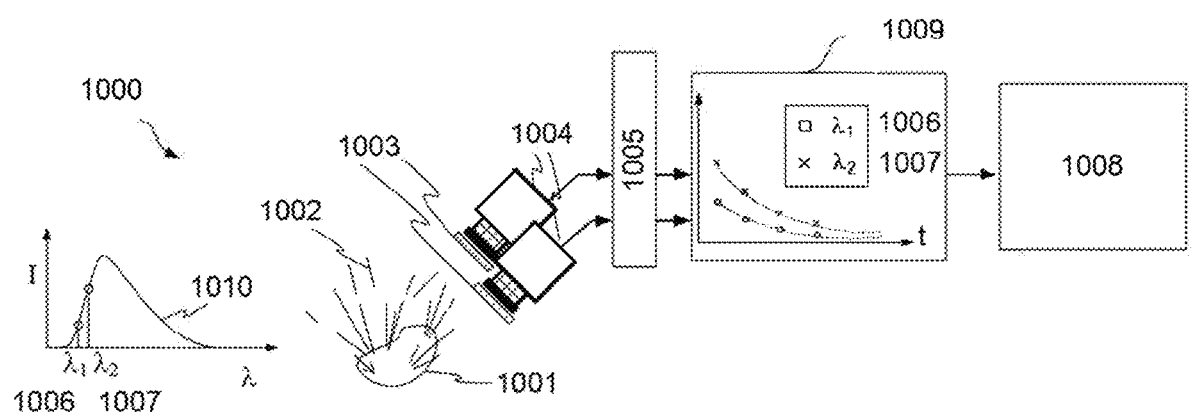
FIG. 10 illustrates use of a combination of cameras and narrowband optical filters to capture an image of the hot surface.

One of the challenges with this kind of imaging is sparking that occurs during powder bed metal sintering. To overcome this, the image is digitally filtered and processed to remove the sparking noise. The sparks in the image have characteristic linear shape. Therefore, spatial filtering of the image by means of Fourier Transformation, and removing the high-spatial frequency components from the image will remove this noise. Details of cooling rate measurement apparatus is shown in FIG. 10 which illustrates where a combination of camera(s) and narrowband optical filters are used to capture an image of the hot surface. The signal amplitude captured by the camera will decay as that section cools down, and the rate at which the amplitude decays indicates the cooling rate.

FIG. 10 illustrates cooling-rate measurement 1000 by imaging the hot metal as it cools down, right after exposure to sintering laser. Narrow pass-band optical filters help increase sensitivity by passing narrow portion of the emission spectrum. Digital filtering reduces the spark noise. FIG. 10 depicts detection of cooling rate of melting or sintering spot 1001, sparks 1002 that appear when a sintering laser is incident on metal powder during 3D metal printing, optical filters 1003, multi-wavelength (visible/IR) cameras 1004, digital filtering 1005 of the detected data or image to remove noise in the image, such as noise due to sparks, change of signal 1009 versus time at each pixel of the camera at one or more wavelengths such as $\lambda_1$ 1006, $\lambda_2$ 1007, which result in determining the cooling rate 1008 of the metal at each spot on the printed part, extracted from a change in signal at each camera pixel. This is due to the fact that the emission spectra 1010 changes in the time, namely as the part cools, also depicted in FIGS. 8A and 8B. Changes in the cooling rate are due to the features of the part as well as due to voids, improperly melted section on the part and other types of defects. Therefore, cooling rate detection determines the integrity of the part and reveals defects.

During metal 3D printing, areas with defects such as voids cool much slower than the area without voids. This can also be detected by the described multi-wavelength approach using visible/near IR camera, namely by rapidly detecting the color change due to cooling right after the sintering or melting laser is turned off or moved to another spot.

Figure 12:
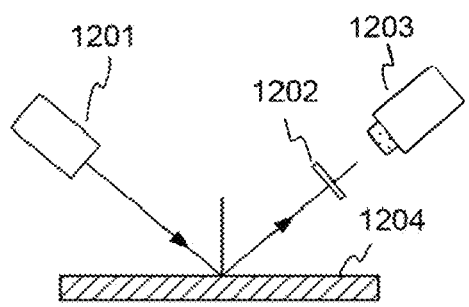
FIG. 12 is a perspective pictorial and block diagram illustrating an embodiment for polarization imaging.

FIG. 12 is a perspective pictorial and block diagram illustrating an embodiment for polarization imaging using a light source 1201 illuminating a specimen 1204, and a camera 1203 with a polarizer 1202 placed in front of the camera. In alternative embodiments, the light source can be polarized, randomly polarized or circularly polarized. In other embodiments, a polarizer, a wave plate or a combination of both are used in front of the light source to control the state of the incident light polarization.

FIGS. 13A to 13F are perspective pictorial and block diagrams illustrating an embodiment depicting various methods of simultaneously detecting multiple polarization states. FIGS. 13A to 13F depict beam splitter 1301, polarizer 1302, camera 1303, polarization 1304, imaging lens 1305, lens or lenslet array 1306, polarizer array 1307, focal plane array 1308, multiple images each for different polarization state 1309, polarizer fine array 1310, and each pixel or cluster of pixels represent different polarization state 1311.

Figure 13A:
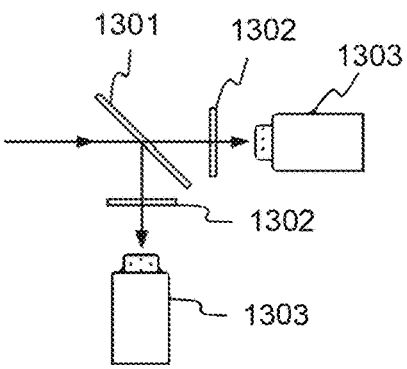
FIGS. 13A to 13F are perspective pictorial and block diagrams illustrating various multi-state polarization detection methods.
Figure 13B:
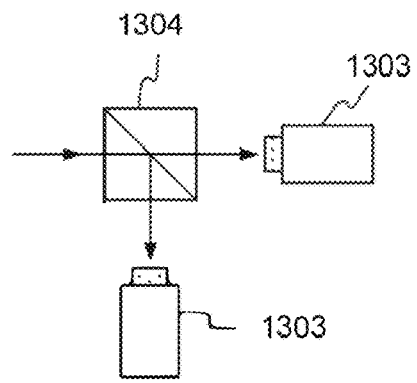
Figure 13C:
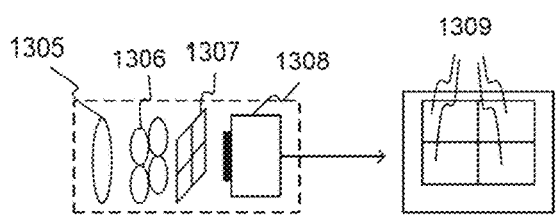
Figure 13D:
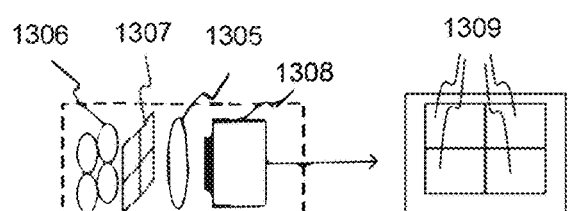
Figure 13E:
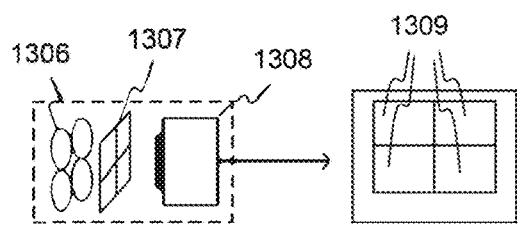
Figure 13F:
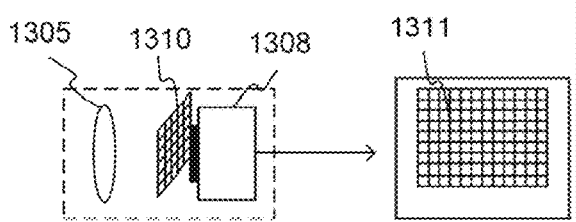

FIG. 13A depicts using a beam splitter 1301, such as a reflective plate beam splitter, a cube beam splitter or a diffractive beam splitter, combined with polarizers in front each camera. FIG. 13B depicts using a polarization beam splitter. FIGS. 13C to 13E illustrates use of lens array and polarizer arrays to capture multiple polarization states. FIG. 13F illustrates use of fine polarizer array in front of the camera, or embedded on the camera chip to produce multiple state polarization images. In an alternative embodiment similar to FIGS. 13A and 13B, focusing lenses are placed in front of each camera after the beam splitter. Yet in another embodiment similar to FIGS. 13A and 13B, a focusing lens is placed before the beam splitter resulting in focused images on both cameras. In various embodiments similar to FIGS. 13A to 13F, the images are combined digitally to determine various polarization states, indicate the difference in between states, and shift the images for overlap of the images, or a combination thereof.

Figure 14:
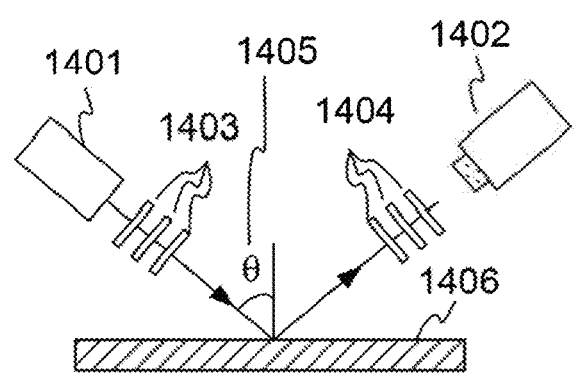
FIG. 14 is a perspective pictorial and block diagram illustrating a multi-wavelength polarization imaging.

FIG. 14 is a perspective pictorial and block diagram illustrating spectral or multi-wavelength polarization imaging using a combination of polarizers, wave-plates and spectral filters. In some embodiments, only linear polarizers are used in front of the camera. In other embodiments, polarizers are used in front of the light source and in front of the camera. Yet in other embodiments, wave-plates are added to control the polarization state, form linear to elliptical to circular. FIG. 14 depicts light source 1401, camera 1402, polarizer, wave plate and filter 1403 placed in the incident light path, and a polarizer, wave plate and filter 1404 placed in the reflected or scattered light path from the specimen 1406, at an incident angle $\theta$ 405.

In some embodiments similar to FIGS. 9 and 14, a monochromatic light, a laser, a white light, a broad spectral light with a spectral filter in front of it, a spectral are used. In other embodiments, a filter in front of the camera, or a color camera, or a combination thereof are used.

FIGS. 15A to 15F are pictorial diagrams showing images and data obtained using scanning radial illumination imaging examples. FIGS. 15A to 15F depict part outline 1501, detected defects 1502, and large gap between print lines 1503. FIG. 15A and FIG. 15B show detection with Illumination at 160 degrees and at 170 degrees, respectively. FIG. 15C and FIG. 15D are the processed image to remove background of the images in FIGS. 15A and 15B. FIG. 15E is the digitally combined image of FIG. 15C and FIG. 15D as described in equation 1. FIG. 15F is a microscopic inspection image of the printed part. Arrows indicate a large gap between the print lines. Data in FIG. 15E matches the gaps observed by the microscopic image shown in FIG. 15F. Image widths of FIGS. 15A to 15D image are 30 mm. Image width of FIG. 15F is 18 mm.

Figure 16A:
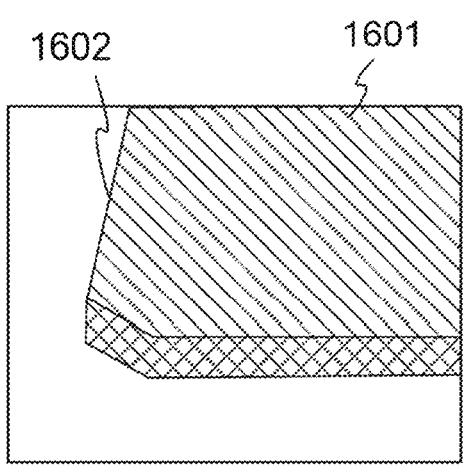
FIGS. 16A and 16B are pictorial diagrams showing images and data obtained using polarization imaging.
Figure 16B:
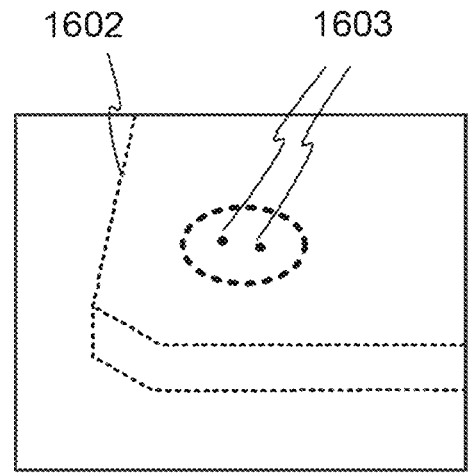

FIG. 16A is a pictorial diagram showing an image of a 3D printed specimen 1601 viewed with standard room light illuminated. FIG. 16B is a pictorial diagram showing the specimen being imaged through a vertical polarizer which indicates two spots (inside the dotted circle) that have different print angles than the other surrounding area. FIGS. 16A and 16b depict printed part 1601, part outline 1602 and detected defects 1603.

Figure 17A:
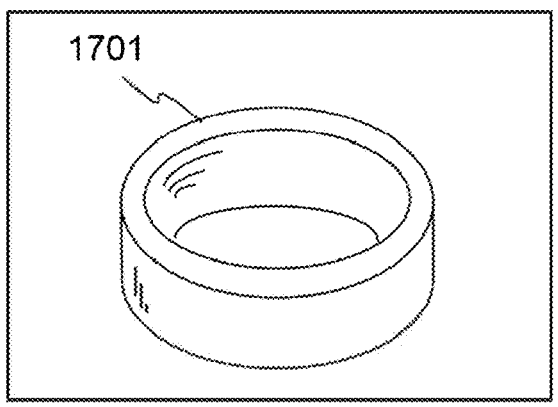
FIGS. 17A and 17B are pictorial diagrams showing images and data obtained using polarization imaging and spectral filtering for birefringence and stress detection.
Figure 17B:
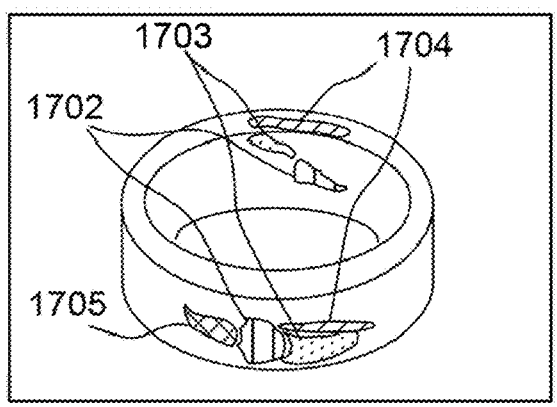

FIG. 17A is a pictorial diagram showing an image of a 3D printed specimen 1701 viewed with standard room light illuminated. FIG. 17B is a pictorial diagram showing an example of a birefringence image of the specimen 1701 or part being printed shown in FIG. 17A, obtained using an apparatus similar to that depicted in FIG. 14. Here two cross polarizers are used, one placed in front of the source, and another placed in front of the camera, and illumination with white light. Colors red 1702, yellow 1703, green 1704, and blue 1705 indicate variations in birefringence due to different stresses in the printed material.

It should be obvious to those skilled in the art that the birefringence image obtained similar to that shown in FIG. 17B will show birefringence and indicate stress either at the top surface, namely the surface that is being printed, or stress induced on the already printed portion of the specimen as it is being printed, or both.

FIG. 18A is a pictorial diagram showing images and data illustrating an example of images and data obtained using modulated speckle illumination as described in the present invention. Bright spots in the image indicate presence of voids and line breakage. FIG. 18B is a pictorial diagram showing an image of a 3D printed specimen viewed by microscope inspection, showing a pit (indicated by the arrow) that results in a bright spot in the image shown in FIG. 18B. FIGS. 18A and 18B depict part outline 1801, detected defects 1802, details of print lines 1803, and a void 1804 viewed under a microscope in FIG. 18B.

In some embodiments, modulated speckle illumination detection described herein enables detection of voids, line breakage, surface roughness variations, and deviation of the printed surface from the desired surface.

Using multi-parameter detection enables a robust real-time inspection method that ensures printed part quality. It provides measurement redundancy, maximizing likelihood of detecting defects that may otherwise be missed using a single parameter sensing approach, and avoids false readings. In some embodiments, the apparatus depicted in FIGS. 3 to 14 are used for quality control and used as an add-on unit for quality control and feedback to additive manufacturing (AM) tool available in the market.

The apparatus described in this application is an AM chamber-mounted architecture as shown in FIG. 3, with the optics designed to enable detection within the movement range of the AM unit manufactured part.

In other embodiments, the apparatus can be an attachment to the AM unit.

Yet in another embodiment, the apparatus depicted in FIGS. 3 to 14 can be made to view the printed sample through a chamber window.

In another embodiment similar to FIG. 3, the apparatus described in FIGS. 1 to 14 can be used as a stand-alone unit for post fabrication inspection of the print-head mounted architecture.

In other embodiments, the light delivery, the cameras, or both can be coupled via fiber optics, a fiber array, or fiber bundles or combination thereof, to make the apparatus compact.

The advantage of the use of multi-parameter approach is that each parameter reveals various types of defects, thus it covers a broad range of print quality issues in a compact, light-weight, and high sensitivity robust manner.

Using the angular scanning imaging approach, defects are revealed in a field deposition model (FDM) printed plastic part that contained some defects, such as gaps between the lines. Illumination with sources placed at two different radial angles, one at 160 degrees and another at 170 degrees, where 0 degrees is referred to the camera view, different defects are revealed, as shown in FIG. 15A and FIG. 15B, where the bright lines indicate the gap between the print layers. Here, light is reflected from the print lines of the layer below the top surface. To make the data machine ready for automatic testing, a series of digital processing steps are performed to remove the background, and the results of the digitally processed images for 160 and 170 degree illumination are shown in FIG. 15C and FIG. 15D, respectively. The data from these two figures are digitally combined, namely integrated, and the result is shown in FIG. 15E, revealing the multiple lines with missing gaps indicated by the arrows. As a comparison, microscopic inspection of the part after being printed shows where these defects are, as shown in FIG. 15F. This example illustrates detection of small gaps in print lines using the angular or radial scanning illumination without the need for high-magnification inspection using a microscope.

Figure 19A:
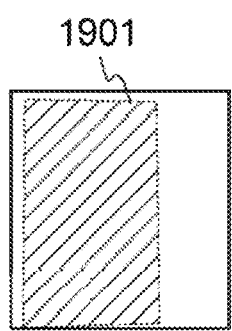
FIGS. 19A to 19C are pictorial diagrams showing images and data illustrating an example of images and data obtained using angular scanning illumination to reveal incorrect print angles or print angle variations.
Figure 19B:
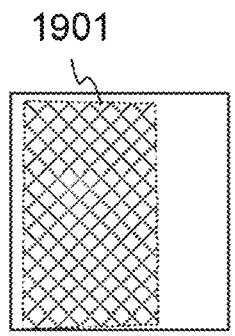
Figure 19C:
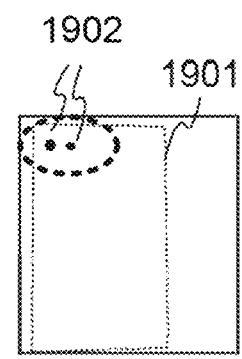

In some embodiment the angular scans depicted in FIG. 2 and FIG. 3 reveals incorrect print angles or print angle variations. An example of detection of incorrect print angle is depicted in FIGS. 19A to 19C. In this example, the incident angles are at 90 and 30 degrees radial illumination as shown in FIG. 19A and FIG. 19B. After performing differential computation and digital filtering, a defect, namely print areas that are at different angles than the remaining surface are revealed, as shown inside the dotted circle in FIG. 19C. FIGS. 19A to 19C depict part outline 1901, and detected defects 1902.

Print Quality Assessment by Polarization Imaging

Polarization measurements can distinguish between different types of surface finish or surface angle, and reveal deviation from a desired print surface. Parallel and perpendicular polarized light have different reflectivity from a dielectric surface, and this difference depends on the angle of incidence. Using two polarization states will reveal a difference in surface finish and changes in angle of print, particularly when the two states are subtracted. Two polarization states measurements can be achieved by several methods, such as:

a. using rotating polarizers in front of a camera as depicted in FIG. 12;
b. using two cameras next to each other with polarizers placed in front of them at vertical and horizontal orientation;
c. using a beam sputter and polarizer as shown in FIG. 13A;
d. using a polarization beam splitter directing light to two different cameras as shown in FIG. 13B;
e. using a lens array and polarizers as shown in FIGS. 13C, 13D, 13E; or
f. using a fine pitch polarizer array as depicted in FIG. 13F.

Polarization-based defect detection is demonstrated using 3D printed specimens, as shown in FIGS. 16A and 16B. FIG. 16A is a photograph of the specimen with standard room lighting. FIG. 16B is a polarization image taken using a vertically oriented polarizer in front of the camera. At this angle, surface reflection from the specimen is suppressed by the vertical polarizer, because reflection is primarily parallel polarized to the surface. However, a section indicated by the two dots in FIG. 16B, the image clearly indicates incorrect print angle and therefore has much higher reflectivity since polarized reflection is dependent on the angle of incidence.

Polarization Based Birefringence and Stress Measurements:

Another application of polarization-based detection is assessing printed part stress on optically clear materials by measuring birefringence, namely:

$$\Delta \varphi = \left(\frac{2\pi d}{\lambda_0}\right)(|n_0 - n_e|) \qquad \text{(Eq. 3)}$$

where $\lambda_o$ is the wavelength in vacuum, d is the optical path length, and $n_e$ and $n_o$ refer to refractive indexes of e- and o-waves. Stress build up in the material can be measured using two cross polarizers, one in front of the source, and another in front of the camera. If a monochromatic light is used, such as a narrow-band LED, then fringes appear that indicate stress buildup. Closely positioned fringes indicate high stress. From such measurements, birefringence can be calculated using Jones matrix formulation.

Another approach to birefringence measurement is to use a broad-spectrum light source, such as white light illumination, and use a color camera, with cross polarizers, as described above. In this case, color fringes indicate stress. An example of birefringence measurement using a clear plastic printed part is shown in FIGS. 17A and 17B.

Detection of Defects and Modulated Speckle Illumination

Speckle noise is often a nuisance in coherent imaging applications. In the application however, coherent illumination is utilized by to detect very small variations in print lines, such as voids and pits. Because of its coherence characteristics, laser illumination results in speckle pattern when it passes through a diffuse media. Speckle size dependents on the random distribution of the diffuse media, and aperture size or the illumination spot incident on the diffuse media. When this diffuse illumination pattern is incident on a print surface with areas that contain pits, voids, or small defects on the order of the speckle size, very bright signal is detected by the camera viewing the illuminated part. Therefore, small defects can be detected by this approach. Another method of generating a speckle illumination is using a multi-mode fiber. The two methods of generating speckle pattern are shown in FIGS. 7A to 7D.

The observed image however will be very noisy, which is a characteristic of coherent illumination. To reduce speckle noise from the image while maintaining the advantage of coherent detection, either the random media, or the multi-mode fiber shown in FIGS. 7A to 7D are moved to smooth the detected image[1].

To ensure that the signal is due to pits or other small defects, and to minimize chance of false calling a defect, the speckle generation source is spatially modulated as shown in FIGS. 7A to 7D. Dust and other sources of noise can cause bright spot in the image as well. Pits and other stationary defects result in a bright spot in the image which re-appear as the speckle generation source is moved, or spatially modulated, whereas random speckle noise is a one-time occurrence. Therefore, spatial modulation will enable elimination of false readings. This approach can easily distinguish between signal due to actual defects in the print and due to dust and other particles, because the signal from defects is relatively stationary with respect to the sample.

Bright spots are observed as shown in FIG. 18A indicating detected defects 1802. Inspection of the part with a microscope, reveals small pits or a void 1804 shown in FIG. 18B.

Detection of such defects can be essential for applications where maintaining uniform line width is crucial. For example, in applications where deposited layers have specific conductivity, printed electronics, then a pit or a void 1804 as shown in FIG. 18B can result in reduction in conductivity of the line, and therefore diminished performance.

Multi-Wavelength Imaging

Multi-wavelength imaging is utilized for two reasons. First, for in-situ monitoring multi-material prints, and second, for birefringence measurements when combined with polarization imaging. Second, multi-wavelength imaging is used for monitoring stress buildup in optically clear materials. Multi-wavelength measurements are achieved using multi-color LED-s combined with monochrome cameras, or using white light sources combined with color cameras as depicted in FIGS. 9 and 14.

For the apparatus depicted in various figures in the present invention, the camera image is digitized, transferred to a computer and image processing and computing are conventionally performed.

In some embodiments similar to FIGS. 7A to 7D, the coherent source, is a laser diode, a super luminescent source, a light emitting diode (LED), a light source or an LED with a narrow band wavelength filter placed in front of it or in the optical path, a gas laser, a solid state laser, or any other coherent or partially coherent source.

In another embodiment similar to FIGS. 7A to 7D, multiple coherent or partially coherent light sources of the same or different wavelengths are used to enable testing of materials of different characteristics and reflectivity.

Yet in other embodiments similar to FIG. 7C, speckle size is fixed, varied, or controlled to detect various size defects by controlling the illumination spot size on the diffuse media, or by selection of diffuse media granularity, or a combination thereof.

Yet in other embodiments similar to FIG. 7D, speckle size is fixed, varied, or controlled to detect various size defects by controlling optical fiber shape, size of the granularity, or polishing grit off the tip, the tapering angle, or a combination thereof.

Coherent illumination will generate an image that is full of speckle noise which makes it difficult to separate the signal from the defective area from noise. To overcome this, the present invention employs speckle noise reduction technique using a rapidly moving diffuser. Note that even though the speckle pattern is moving, it will still reveal the defects, but noise in the image will be significantly reduced.

In some embodiments similar to FIGS. 3 to 14, the obtained data and images are digitally processed using digital filter, digital correlation, convolution, Fourier filtering and Fourier analysis, Fourier transforms, differentiation, image addition, subtraction, multiplication, linear algebra and matrix calculations, morphological processing, neural computing, wavelet transforms, thresholding and calibration, such as background removal. These digital processes are performed either on each camera image, or on more camera images, or combining all camera images, performing spatial processing such as in between pixels, in a single image, between various images, or temporal competition and analysis, such as between different frames, or a combination thereof.

In other embodiments similar to FIGS. 3 to 14 and data obtained similar to. FIGS. 15E, 16B, 17B, and 18A, the image may contain defect information, as well as edge and other features due to specimen shape and print that is not a defect. In this case, digital processing described above is performed to distinguish between defective and non-defect signature. It should be obvious to those skilled in the art that an image from defect map and image from standard images or combining various imaging apparatus described herein enables distinction between defect and non-light signature using various digital processing techniques described above.

Assignment of a Digital Defect Value

Figure 15:
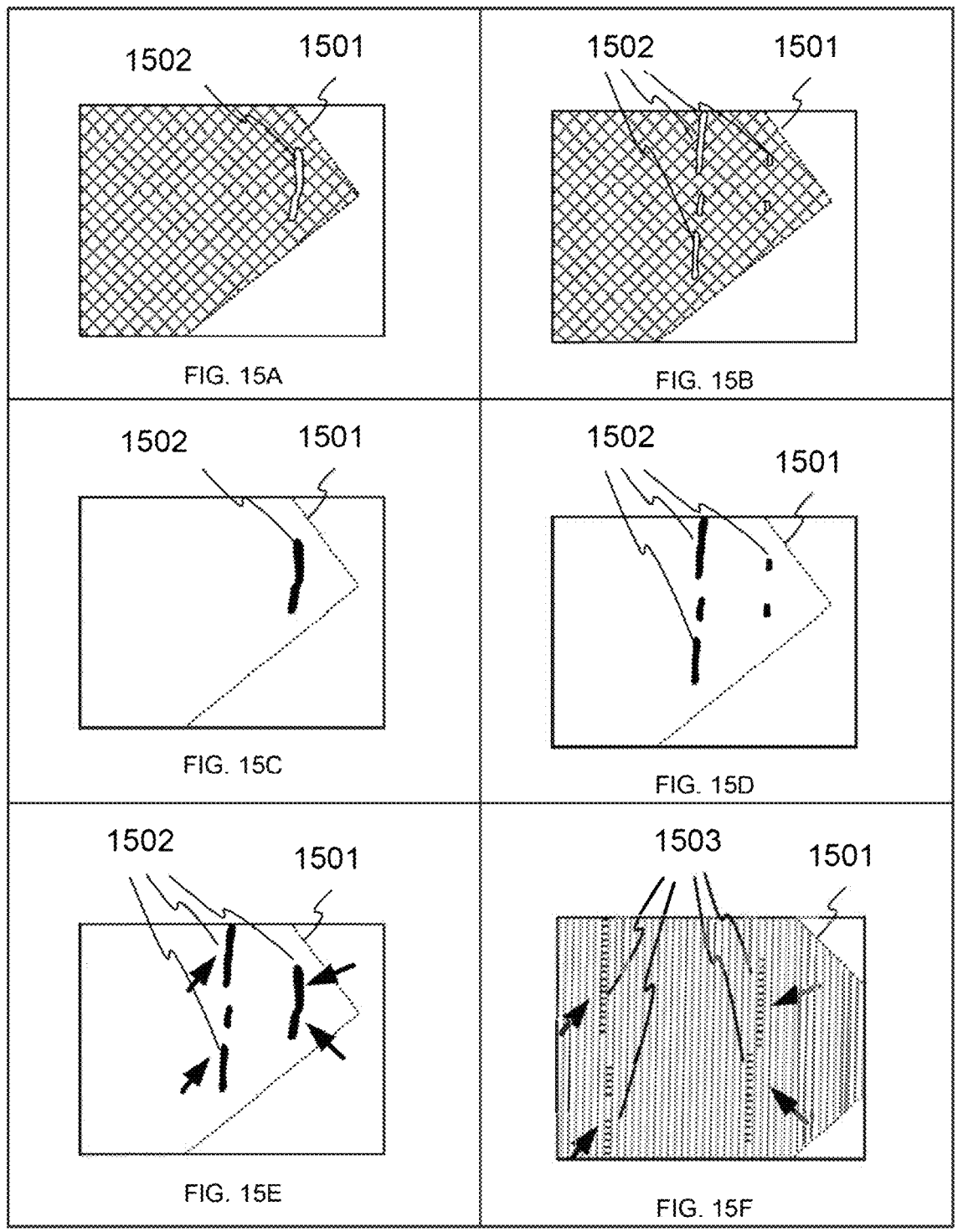
FIGS. 15A to 15F are pictorial diagrams showing images and data obtained using angular scanning illumination.

In an embodiment similar to FIGS. 2, 3, 4, and 7 to 19 and other figures depicted herein, data/defect map obtained similar to those shown in FIGS. 4, 6, 15E, 16B, 17B, and 18A, and other figures herein, the defect map is converted to a digital value by threshold and/or summing the detected defect areas. For example, in an image data such as shown in FIGS. 4A, 4B and 15E, first defect data is separated from other features due to specimen shape, and the summing the pixel values which results in defect value.

Using Feedback for Real-Time Correction

In other embodiments similar to various FIGS. 2 to 19, the detected images and data are used to locate defects and deviation from the expected print layer, and feedback is used to correct or compensate for these defects. Example of correction includes filling voids, lines, print other features in the next print layers to compensate for missing lines. If a bulging occurs, next layer prints around the bulging area. If a defect is determined to be too severe, or if the cumulative defect values reach a prescribed threshold value, the print is stopped to avoid wasting material. The severity of the defects is calculated by using a prescribed threshold either on individual sensor camera and apparatus, and various methods described in the present invention, or on a combination of one or more of them.

Various Embodiments and Various Applications of the Sensor

In some embodiments similar to FIGS. 2, 5A to 5C, 7, and 10, a monochromatic light, a laser, a white light, a broad spectral light with a spectral filter in front of it, a spectral are used. In other embodiments a filter in front of the camera, or a color camera, or a combination thereof are used.

In some embodiments, speckle illumination detection described herein enables detection of voids, line breakage, surface roughness variations, and deviation of the printed surface from the desired surface.

The apparatus described in this application is an AM chamber-mounted architecture as shown in FIG. 2, with the optics designed to enable detection within the movement range of the AM unit manufactured part.

In other embodiments, the apparatus can be an attachment to the AM unit.

Yet in another embodiment, the apparatus depicted herein can be made to view the printed sample through a chamber window.

In another embodiment similar to FIG. 2, the apparatus is used as a stand-alone unit for post fabrication inspection of the print-head mounted architecture.

In other embodiments, the light delivery, the cameras, or both can be coupled via fiber optics, a fiber array, or fiber bundles or combination thereof, to make the apparatus compact.

In some embodiments similar to FIGS. 2, 4, 7, and 10, the obtained data and images are digitally processed using digital filter, digital correlation, convolution, Fourier filtering and Fourier analysis, Fourier transforms, differentiation, image addition, subtraction, multiplication, linear algebra and matrix calculations, morphological processing, neural computing, wavelet transforms, thresholding and calibration, such as background removal. These digital processes are performed either on each camera image, or on more camera images, or combining all camera images, performing spatial processing such as in between pixels, in a single image, between various images, or temporal competition and analysis, such as between different frames, or a combination thereof.

In other embodiments similar to FIGS. 2, 4, 7, and 10 and data obtained similar to FIGS. 4, 6, and 8, the image may contain defect information, as well as edge and other features due to specimen shape and print that is not a defect. In this case, digital processing described above is performed to distinguish between defective and non-defect signature. It should be obvious to those skilled in the art that an image from defect map and image from standard images or combining various imaging apparatus described herein enables distinction between defect and non-light signature using various digital processing techniques described herein.

In various embodiments, several architectures can be configured to produce polarization measurements, and birefringence measurements using various alternative embodiments using one or more of the following combination of components as depicted in various FIGS. 3, 9, 12, and 13.

In some embodiments similar to FIGS. 5, 9, 12, 13A to 13F, and 14, a multi-wavelength and polarization measurements are combined.

In other embodiments similar to FIGS. 5, 9, 12, 13A to 13F, and 14, a camera with multi-wavelength channel outputs are used to produce multi-color images.

In other embodiments similar to FIGS. 5, 9, 12, 13A to 13F, and 14, a camera with multi-wavelength such as red, green, blue and infrared (IR) channel outputs are used to produce multi-spectral images.

In other embodiments similar to FIGS. 5, 9, 12, 13A to 13F, and 14, a monochrome light, such as a halogen lamp with filter, light emitting diode (LED) or a laser used as a light source.

In other embodiments similar to FIGS. 5, 9, 12, 13A to 13F, and 14, a multi-wavelength variable or tunable wavelength is used as a light source.

In other embodiments similar to FIGS. 12, 13A to 13F, and 14, an input polarizer is used for controlling incident light polarization.

In other embodiments similar to FIGS. 12, 13A to 13F, and 14, an input polarizer followed by a wave-plate is used for controlling incident light polarization.

In other embodiments similar to FIGS. 12, 13A to 13F, and 14, a polarizer in front of the camera.

In other embodiments similar to FIGS. 12, 13A to 13F, and 14, a combination of input polarizer and polarizer in front of the camera.

In other embodiments similar to FIGS. 12, 13A to 13F, and 14, a combination of input polarizer and a wave-plate, and polarizer in front of the camera.

In other embodiments similar to FIGS. 12, 13A to 13F, and 14, a polarization beam splitter is used in front of the cameras.

In other embodiments similar to FIGS. 5, 9, 12, 13A to 13F, and 14, an array of sources are used for illumination.

In alternative embodiments, sensor arrangements described throughout this patent application and depicted in FIGS. 3 to 14, are used for in-space manufacturing.

In alternative embodiments, sensor arrangements described throughout this patent application and depicted in FIGS. 1-14, are added to or made part of a fused deposition modeling (FDM) machine.

In alternative embodiments, sensor arrangements described throughout and depicted in FIGS. 1-14, are used for detecting and characterizing voids, inclusions, line breakage, sag, bulging, filament slump, and variations in surface finish, missing lines, and variations in line spacing.

In alternative embodiments, sensor arrangements described throughout this patent application and depicted in FIGS. 1-14, are used for plastic part manufacturing.

In alternative embodiments, sensor arrangements described throughout this patent application and depicted in FIGS. 1-14, are used for metal part manufacturing.

In alternative embodiments, sensor arrangements described throughout this patent application and depicted in FIGS. 1-14, are used for nylon part manufacturing.

In alternative embodiments, sensor arrangements described throughout this patent application and depicted in FIGS. 1-14, are used for organic, inorganic, or metallic part manufacturing.

In alternative embodiments, sensor arrangements described throughout this patent application and depicted in FIGS. 1-14, are used in a stereolithography (SLA) equipment, Polyjet, direct laser melting and sintering, powder bed laser melting or sintering, electron beam melting sintering or powder bed electron beam melting or sintering, powder bed melting and sintering, multi-jet fusion (MJF), selective laser sintering (SLS), direct metal laser sintering (DMLS), direct metal laser melting (DMLS), or any other laser melting equipment, either as an add on unit, or as a diagnostic unit for post process inspection.

In alternative embodiments, sensor arrangements described throughout this patent application and depicted in FIGS. 1-14, are used in acoustic or ultrasonic melting and sintering equipment, either as an add on unit, or as a diagnostic unit for post process inspection.

In alternative embodiments, sensor arrangements described throughout this patent application and depicted in FIGS. 1-14, are used in computer numerical control (CNC) machining equipment, either as an add on unit, or as a diagnostic unit for post process inspection.

In alternative embodiments, sensor arrangements described throughout this patent application and depicted in FIGS. 1-14, are used in additive manufacturing equipment, either as an add on unit, or as a diagnostic unit for post process inspection.

In alternative embodiments, sensor arrangements described throughout this patent application and depicted in FIGS. 1-14, are used in subtractive manufacturing equipment, either as an add on unit, or as a diagnostic unit for post process inspection.

In other embodiments similar to FIGS. 2, 5, 7, 9 and 10, a camera with multi-wavelength channel outputs are used to produce multi-color images.

In other embodiments similar to FIGS. 2, 5, 7, 9 and 10, a camera with multi-wavelength such as red, green, blue and infrared (IR) channel outputs are used to produce multi-spectral images.

In other embodiments similar to FIGS. 2, 5, 7, 9 and 10, a monochrome light, such as a halogen lamp with filter, light emitting diode (LED) or a laser used as a light source.

In other embodiments similar to FIGS. 2, 5, 7, 9 and 10, a multi-wavelength variable or tunable wavelength is used as a light source.

In other embodiments similar to FIGS. 2, 5, 7, 9 and 10, an array of sources is used for illumination.

In alternative embodiments, sensor arrangements described throughout and depicted in FIGS. 2, 5, 7, 9 and 10, are used for manufacturing quality assessment.

In alternative embodiments, sensor arrangements described throughout and depicted in FIGS. 2, 5, 7, 9 and 10, are added to or made part of a direct metal laser sintering (DMLS) machine.

In alternative embodiments, sensor arrangements described throughout and depicted in FIGS. 2, 5, 7, 9 and 10, are added to or made part of a laser melting machine.

In alternative embodiments, sensor arrangements described throughout and depicted in FIGS. 2, 5, 7, 9 and 10, are added to or made part of an additive metal manufacturing machine.

In alternative embodiments, sensor arrangements described throughout and depicted in FIGS. 2, 5, 7, 9 and 10, are used for detecting and characterizing voids, inclusions, line breakage, sag, bulging, and variations in surface finish, missing lines, and variations in line spacing.

In alternative embodiments, sensor arrangements described throughout and depicted in FIGS. 2, 5, 7, 9 and 10, are used for metal, plastic, ceramic, glass, and circuit board manufacturing.

In alternative embodiments, sensor arrangements described throughout and depicted in FIGS. 2, 5, 7, 9 and 10, are used for metal part manufacturing.

In alternative embodiments, sensor arrangements described throughout and depicted in FIGS. 2, 5, 7, 9 and 10, are used for nylon part manufacturing.

In alternative embodiments, sensor arrangements described throughout and depicted in FIGS. 2, 5, 7, 9 and 10, are used for organic, inorganic, or metallic part manufacturing.

In alternative embodiments, sensor arrangements described and depicted in FIGS. 2, 5, 7, 9 and 10, are used in a stereo-lithography (SLA) equipment, Polyjet, direct laser melting and sintering, powder bed laser melting or sintering, electron beam melting sintering or powder bed electron beam melting or sintering, powder bed melting and sintering, multi-jet fusion (MJF), selective laser sintering (SLS), direct metal laser sintering (DMLS), direct metal laser melting (DMLS), or any other laser melting equipment, either as an add on unit, or as a diagnostic unit for post process inspection.

In alternative embodiments, sensor arrangements described throughout and depicted in FIGS. 2, 5, 7, 9 and 10, are used in acoustic or ultrasonic melting and sintering equipment, either as an add on unit, or as a diagnostic unit for post process inspection.

In alternative embodiments, sensor arrangements described throughout and depicted in FIGS. 2, 5, 7, 9 and 10, are used in computer numerical control (CNC) machining equipment, either as an add on unit, or as a diagnostic unit for post process inspection.

In alternative embodiments, sensor arrangements described throughout and depicted in FIGS. 2, 5, 7, 9 and 10, are used in additive manufacturing equipment, either as an add on unit, or as a diagnostic unit for post process inspection.

In alternative embodiments, sensor arrangements described throughout and depicted in FIGS. 2, 5, 7, 9 and 10, are used in subtractive manufacturing equipment, either as an add on unit, or as a diagnostic unit for post process inspection, or both.

In alternative embodiments, sensor arrangements described throughout and depicted in FIGS. 2, 5, 7, 9 and 10, the outputs of each sensing approach or sensor is used independently and combined with other sensing approaches or sensors described herein to produce final result of defect map.

In alternative embodiments, sensor arrangements described throughout and depicted in FIGS. 2, 5, 7, 9 and 10, the outputs of each sensing approach or sensor is combined or compared with one or more another sensing approach or sensor to produce a correlated result. In some embodiments this is achieved by subtraction, addition, multiplication, correlation or convolution, digital shifting, Fourier analysis and transforms, linear algebra and matrix calculations.

In alternative embodiments, sensor arrangements described throughout and depicted in FIGS. 2, 5, 7, 9 and 10 the outputs of each sensor is adjusted and corrected for movement of the part if the print bed moves, is raised or lowered, and if the part moves. This is achieved by transferring movement data from the 3D printer to the sensor unit and using a calibration data to correct for changes in image width, size and any image distortion.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

What is claimed is:

1. A method of constructing a multi-modal inspection apparatus for detecting defects in an additive manufactured part during printing, comprising:
   providing an additive manufacturing device having a printhead for manufacturing an additive manufactured part, wherein the additive manufacturing device includes a laser entrance window;
   providing a speckle generation source located adjacent to the window;
   providing a plurality of light sources located adjacent to the speckle generation source; providing a plurality of image capturing located at a pre-determined distance away from the speckle generation source and the plurality of light sources, wherein the speckle generation source, the plurality of light sources, and the plurality of image capturing devices are used to inspect the additive manufactured part as the additive manufactured part is being made by the additive manufacturing device, to provide feedback to the additive manufacturing device for correction of the manufacturing of the additive manufactured part by the additive manufacturing device, or to stop the manufacturing of the additive manufactured part, and wherein the plurality of image capturing devices further includes a polarization image detector for use in providing information about variations in a finish of the printed surface and measuring stress in the additive manufactured part as the additive manufactured is being made by the additive manufacturing device, wherein the polarization image detector includes;
   a beam splitter,
   a plurality of polarizers located adjacent to the beam splitter, and
   a plurality of cameras, where each camera of the plurality of cameras is located adjacent a polarizer of the plurality of polarizers; and
   providing a processor operatively connected to the plurality of image capturing devices for processing information from the plurality of image capturing devices and providing a map of any defects in the additive manufactured part.

2. A sensing device, comprising:
   an additive manufacturing device having a printhead for manufacturing an additive manufactured part, wherein the additive manufacturing device includes a laser entrance window;
   a speckle generation source located adjacent to the window;
   a plurality of light sources located adjacent to the speckle generation source;
   a plurality of image capturing devices located at a pre-determined distance away from the speckle generation source and the plurality of light sources, wherein the speckle generation source, the plurality of light sources, and the plurality of image capturing devices are used to inspect the additive manufactured part as the additive manufactured part is being made by the additive manufacturing device, to provide feedback to the additive manufacturing device for correction of the manufacturing of the additive manufactured part by the additive manufacturing device, or to stop the manufacturing of the additive manufactured part, and wherein the plurality of image capturing devices further includes a polarization image detector for use in providing information about variations in a finish of the printed surface and measuring stress in the additive manufactured part as the additive manufactured is being made by the additive manufacturing device, wherein the polarization image detector includes;
   a beam splitter,
   a plurality of polarizers located adjacent to the beam splitter, and
   a plurality of cameras, wherein each camera of the plurality of cameras is located adjacent a polarizer of the plurality of polarizers; and
   a processor operatively connected to the plurality of image capturing devices for processing information from the plurality of image capturing devices and providing a map of any defects in the additive manufactured part.

* * * * *